United States Patent
Bates et al.

(10) Patent No.: US 9,262,149 B2
(45) Date of Patent: Feb. 16, 2016

(54) MANAGING INCREMENTALLY APPLIED SYSTEM UPDATES

(75) Inventors: Kevin B. Bates, Sebastopol, CA (US); William J. Carpenter, Bothell, WA (US); Michael G. Winter, Camarillo, CA (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 13/445,011

(22) Filed: Apr. 12, 2012

(65) Prior Publication Data

US 2013/0275741 A1 Oct. 17, 2013

(51) Int. Cl.
*G06F 9/45* (2006.01)
*G06F 9/445* (2006.01)

(52) U.S. Cl.
CPC ... *G06F 8/65* (2013.01); *G06F 8/62* (2013.01); *G06F 9/445* (2013.01)

(58) Field of Classification Search
CPC .............. G06F 8/62; G06F 8/65; G06F 9/445
See application file for complete search history.

(56) References Cited

U.S. PATENT DOCUMENTS

| | | | | |
|---|---|---|---|---|
| 5,553,239 | A * | 9/1996 | Heath et al. .................. | 726/2 |
| 6,125,372 | A * | 9/2000 | White | |
| 7,080,371 | B1 * | 7/2006 | Arnaiz ...................... | G06F 8/65 717/168 |
| 7,617,257 | B2 * | 11/2009 | Sathyanarayan et al. | |
| 7,681,245 | B2 | 3/2010 | Walker et al. | |
| 7,761,865 | B2 | 7/2010 | Stienhans et al. | |
| 7,849,458 | B2 * | 12/2010 | Kurzweil ............... | G06F 21/10 717/168 |
| 2002/0033843 | A1 * | 3/2002 | Loos ....................... | G06F 9/445 715/740 |
| 2002/0069272 | A1 * | 6/2002 | Kim et al. ..................... | 709/221 |
| 2002/0073145 | A1 * | 6/2002 | Shimoji .................. | G06F 9/445 709/203 |
| 2002/0100036 | A1 * | 7/2002 | Moshir ..................... | G06F 8/62 717/173 |
| 2004/0187103 | A1 * | 9/2004 | Wickham ................. | G06F 8/65 717/168 |
| 2005/0066019 | A1 * | 3/2005 | Egan ........................ | G06F 8/65 709/223 |

(Continued)

OTHER PUBLICATIONS

Gideon Juve et al., "Automating Application Deployment in Infrastructure Clouds", [Online], 2011, pp. 658-665, [Retrieved from Internet on Oct. 8, 2015], <http://ieeexplore.ieee.org/stamp/stamp.jsp?tp=&arnumber=6133211>.*

(Continued)

*Primary Examiner* — Thuy Dao
*Assistant Examiner* — Ziaul A Chowdhury
(74) *Attorney, Agent, or Firm* — Farrokh Pourmirzaie; Edell, Shapiro & Finnan, LLC

(57) ABSTRACT

According to one embodiment of the present invention, a computer system updates a system including a plurality of server instances, and includes at least one processor. The computer system determines a level of configuration for each operating server instance. One or more sets of operational features are added to the system based on a comparison between the determined levels of configuration of the operating server instances and minimum levels of configuration associated with the one or more sets of operational features. Server operations are performed and one or more corresponding sets of operational features are applied to the server operations in response to the addition of those corresponding sets of operational features to the system. Embodiments of the present invention further include a method and computer program product for updating a system including a plurality of server instances in substantially the same manner described above.

21 Claims, 6 Drawing Sheets

(56) References Cited

U.S. PATENT DOCUMENTS

| | | | | |
|---|---|---|---|---|
| 2005/0144616 | A1* | 6/2005 | Hammond | G06F 8/65 717/173 |
| 2005/0210459 | A1* | 9/2005 | Henderson | G06F 8/65 717/168 |
| 2005/0289536 | A1* | 12/2005 | Nayak et al. | 717/174 |
| 2006/0179431 | A1* | 8/2006 | Devanathan | G06F 8/61 717/168 |
| 2007/0143390 | A1* | 6/2007 | Giambalvo et al. | 709/200 |
| 2008/0244552 | A1* | 10/2008 | Toeroe | 717/168 |
| 2009/0007135 | A1* | 1/2009 | Rathunde | G06F 8/65 718/107 |
| 2009/0328024 | A1 | 12/2009 | Li et al. | |
| 2010/0161657 | A1* | 6/2010 | Cha et al. | 707/770 |
| 2010/0162226 | A1* | 6/2010 | Borissov et al. | 717/173 |
| 2010/0169200 | A1 | 7/2010 | Gomes et al. | |
| 2010/0287543 | A1* | 11/2010 | Wehkamp | G06F 8/71 717/171 |
| 2011/0016461 | A1 | 1/2011 | Bankston et al. | |
| 2011/0035738 | A1 | 2/2011 | Toeroe et al. | |
| 2011/0040860 | A1* | 2/2011 | DeCusatis et al. | 709/223 |
| 2011/0093371 | A1 | 4/2011 | Clemm et al. | |
| 2011/0099266 | A1 | 4/2011 | Calder et al. | |
| 2011/0191771 | A1 | 8/2011 | Balassanian | |
| 2012/0185529 | A1* | 7/2012 | Shimamoto | 709/203 |
| 2014/0040875 | A1* | 2/2014 | Bower, III | G06F 8/65 717/170 |

OTHER PUBLICATIONS

Henry M. Levy et al., "Modules, Objects and Distributed Programming: Issues in RPC and Remote Object Invocation", [Online], 1991, pp. 77-90 , [Retrieved from Internet on Oct. 8, 2015], <http://onlinelibrary.wiley.com/doi/10.1002/spe.4380210106/epdf>.*

Federico D. Sacerdoti et al., "Grid Systems Deployment & Management Using Rocks", [Online], 2004, pp. 337-345, [Retrieved from Internet on Oct. 8, 2015], <http://ieeexplore.ieee.org/stamp/stamp.jsp?tp=&arnumber=1392631>.*

S. Brown et al., "Updating Software in Wireless Sensor Networks: A Survey", [Online], 2006, pp. 1-14, [Retrieved from Internet on Oct. 8, 2015], <http://citeseerx.ist.psu.edu/viewdoc/download?doi=10.1.1.100.4510&rep=rep1&type=pdf>.*

Neamtiu et al., "Cloud Software Upgrades: Challenges and Opportunities", MESOCA IEEE International Conference on, Sep. 26, 2011, pp. 1-10.

IBM et al., "System and Method for Packaging Incremental Updates to Software", IPCOM000143104D, Nov. 10, 2006, 5 pages.

Dumitras et al., "Toward Upgrades-as-a-Service in Distributed Systems", 2009, 2 pages.

Antoni Wolski, "Rolling Upgrades for Continuous Services", International Service Availability Symposium (ISAS 2004), May 13-14, 2004, Munich Germany, 21 pages.

UK Combined Search and Examination Report, Application GB1303858.3, Sep. 27, 2013, 6 pages.

* cited by examiner

MANAGING INCREMENTALLY APPLIED SYSTEM UPDATES

BACKGROUND

1. Technical Field

Present invention embodiments relate to system updates, and more specifically, to enabling system updates to be performed in an incremental fashion, thereby reducing or eliminating the time intervals in which the system becomes unavailable due to installation of the updates.

2. Discussion of the Related Art

Customers utilizing large, mission-critical, globally-distributed enterprise content management systems have difficulty in identifying sufficient maintenance windows (or time intervals) for disabling the systems in order to perform even small system upgrade operations. This is due to various factors, including the critical nature of these systems, the large number of dependent users (which translates into a high cost for even small system downtime windows), and the constant activity resulting from users distributed across multiple geographies. Accordingly, implementation of system upgrades tends to be delayed for extended time periods.

BRIEF SUMMARY

According to one embodiment of the present invention, a computer system updates a system including a plurality of sever instances, and includes at least one processor. The computer system determines a level of configuration for each operating server instance. One or more sets of operational features are added to the system based on a comparison between the determined levels of configuration of the operating server instances and minimum levels of configuration associated with the one or more sets of operational features. Server operations are performed and one or more corresponding sets of operational features are applied to the server operations in response to the addition of those corresponding sets of operational features to the system. Embodiments of the present invention further include a method and computer program product for updating a system including a plurality of server instances in substantially the same manner described above.

DETAILED DESCRIPTION

Figure 1:
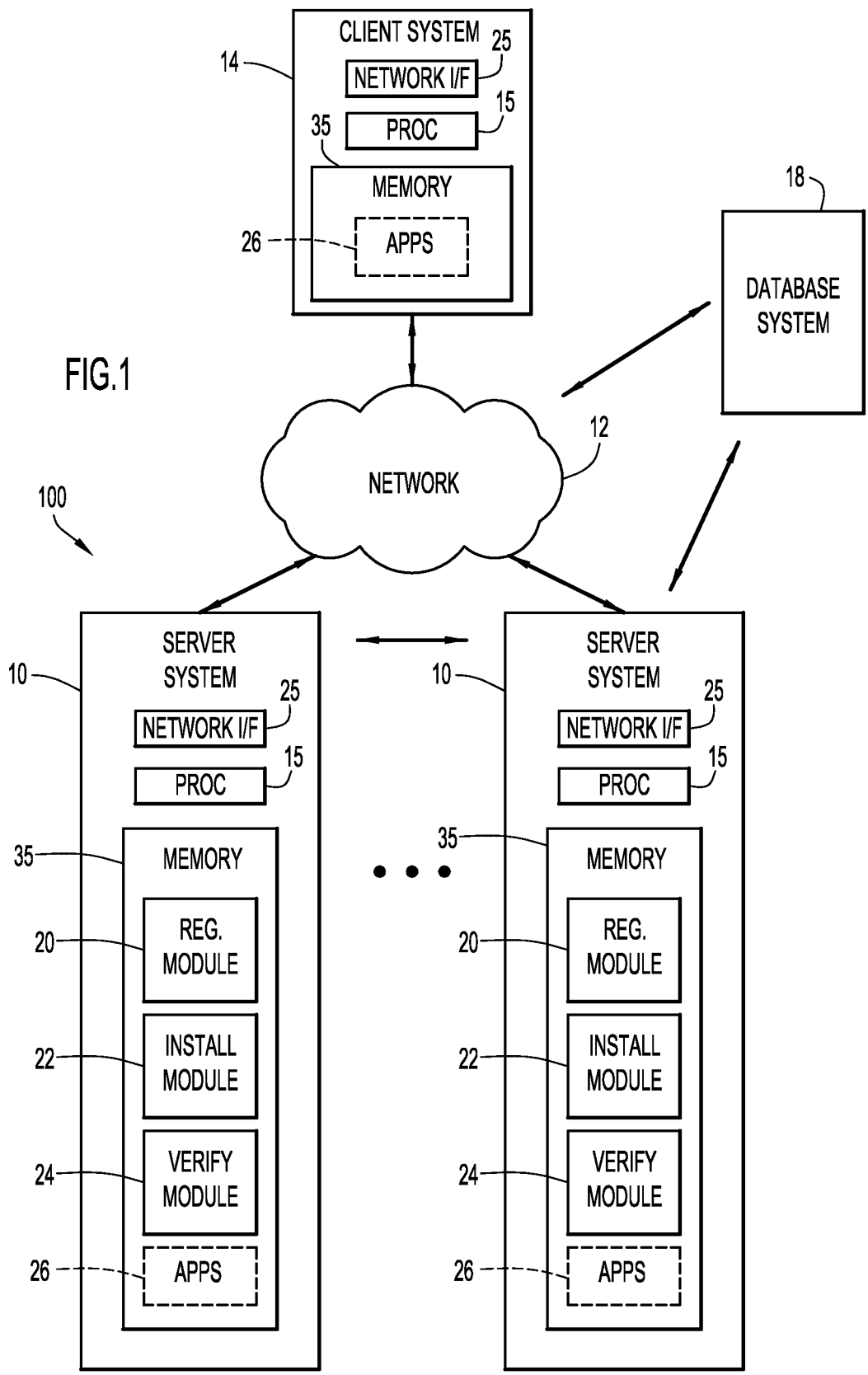
FIG. 1 is a diagrammatic illustration of an example environment or system of an embodiment of the present invention.

Present invention embodiments provide a manner of updating (including upgrading) a system incrementally. In other words, a portion of the system may be disabled in order to be updated, while remaining system portions continue operating.

In order to provide incremental system updates, different server instances (e.g., instances of physical or virtual servers) are enabled to operate with different code revision levels. An impediment to allowing plural server instances to operate at different code revision levels is the inherent functional code processing that occurs based on additional features or capabilities of a given code revision. Newer code revisions may be aware of previous metadata elements and functionality, but older code revisions have no knowledge of new data elements and/or functionality that is inherent in newer code versions. Since the server instances are all operating based on the same persisted data sets and must be able to service requests for any object within the system, present invention embodiments provide a manner to ensure that newer server instances do not introduce new data elements or change the processing behavior for existing data elements in a way that causes integrity issues for either the old or new server instances.

Present invention embodiments define and provide strict enforcement of a packaging mechanism by which all new data elements and any new functional behaviors are strictly controlled in a manner that guarantees consistent and appropriate processing by both old and new server instances. A package (which may be referred to herein for explanatory purposes as an "add-in" component) defines a logically related set of metadata elements and other components to be added to (or to update a previously existing component of) the system and managed in a consistent fashion.

Present invention embodiments formalize the componentized package or add-in structure to provide the functional mechanism to control (or gate) server-side functional behaviors. In other words, the presence or absence of these add-in components control the logical program code paths that are executed within the server. New program code paths are exclusively designed and implemented based on the presence of the add-in component and all previous behaviors are maintained in the absence of the add-in component. This functional compliance based on the presence or absence of an add-in component is enforced at the data server tier and the user interface tier. All the persistence and functional activities for a given request into the system is controlled at the data tier, while all user-interfacing experience related to a given feature set is controlled at the user interface tier based on whether that feature had been enabled ("turned on"). The enablement is implicit in the deployment of the related add-in component.

The packages or add-in components pre-require a given code revision level prior to deployment. Any deployment of a given package or add-in component is strictly enforced such that an add-in component is never allowed to be deployed until all relevant server instances have been updated to the specified code revision level. Both server and client side behavior is controlled or otherwise gated by present invention embodiments based on the presence or absence of a given add-in component. The approach of present invention embodiments enables much more coarse-grained determinations about the state of all data elements related to a particular add-in component and the corresponding features.

Present invention embodiments employ various elements including a package or add-in component and an associated code revision level, a server instance code revision level and corresponding registration, a persistent repository and corresponding record of server instances and applied add-in components, and server side code behaviors based on currently applied add-in components. The package or add-in component represents data definitions and other required elements sufficient to support a given feature or feature set. An attribute of each add-in component is a minimum server code revision level sufficient to support that add-in component. The application of a given add-in component is strictly controlled based on the corresponding server code revision levels. Present invention embodiments provide the guarantees around these server code revision levels, preferably in a stateless farmed server configuration. In order to provide these guarantees, each server instance (e.g., physical or virtual server instances) manages and communicates the code revision level to enable the system to determine a point in time when all operating server instances are at an appropriate code revision level to support the application of a given add-in component.

An example environment or system of a present invention embodiment is illustrated in FIG. 1. Specifically, the system includes a server group or farm 100, and one or more client or end-user systems 14. The server farm includes one or more server systems 10, each including one or more server instances (e.g., physical and/or virtual server instances) operating on the physical hardware of that server system. For example, a server system 10 may be hosting a single server instance, or a plurality of sever instances (e.g., each server instance represented by a virtual server). Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be on the same physical or virtual server, or be local to each other and communicate via any appropriate local communication medium (e.g., LAN, hardwire, wireless link, Intranet, etc.).

Client systems 14 enable users to interact with server farm or group 100 to perform desired operations (e.g., submit update requests, etc.). The server systems include a registration module 20, an install module 22, and a verify module 24 to control and manage incremental system updates or upgrades as described below. The server and client systems may further include one or more applications 26 to perform various processing operations. A database system 18 may store various information for the control and management (e.g., server registration information, code revision levels of server systems 10, add-in components and code revision levels, etc.). The database system may be implemented by any conventional or other database or storage unit, may be local to, remote from, or on the same physical or virtual servers as, server systems 10 and client systems 14, and may communicate via any appropriate communication medium (e.g., local area network (LAN), wide area network (WAN), Internet, hardwire, wireless link, Intranet, etc.).

The client systems may present a graphical user (e.g., GUI, etc.) or other interface (e.g., command line prompts, menu screens, etc.) to solicit information from users pertaining to the desired operations, and may provide reports or displays including various information.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, registration module, install module, verify module, browser/interface software, applications, etc.).

Registration module 20, install module 22, and verify module 24 may include one or more modules or units to perform the various functions of present invention embodiments described below. The various modules (e.g., registration module, install module, verify module, etc.) may be implemented by any combination of any quantity of software and/or hardware modules or units, and may reside within memory 35 of the server systems for execution by processor 15.

Figure 2:
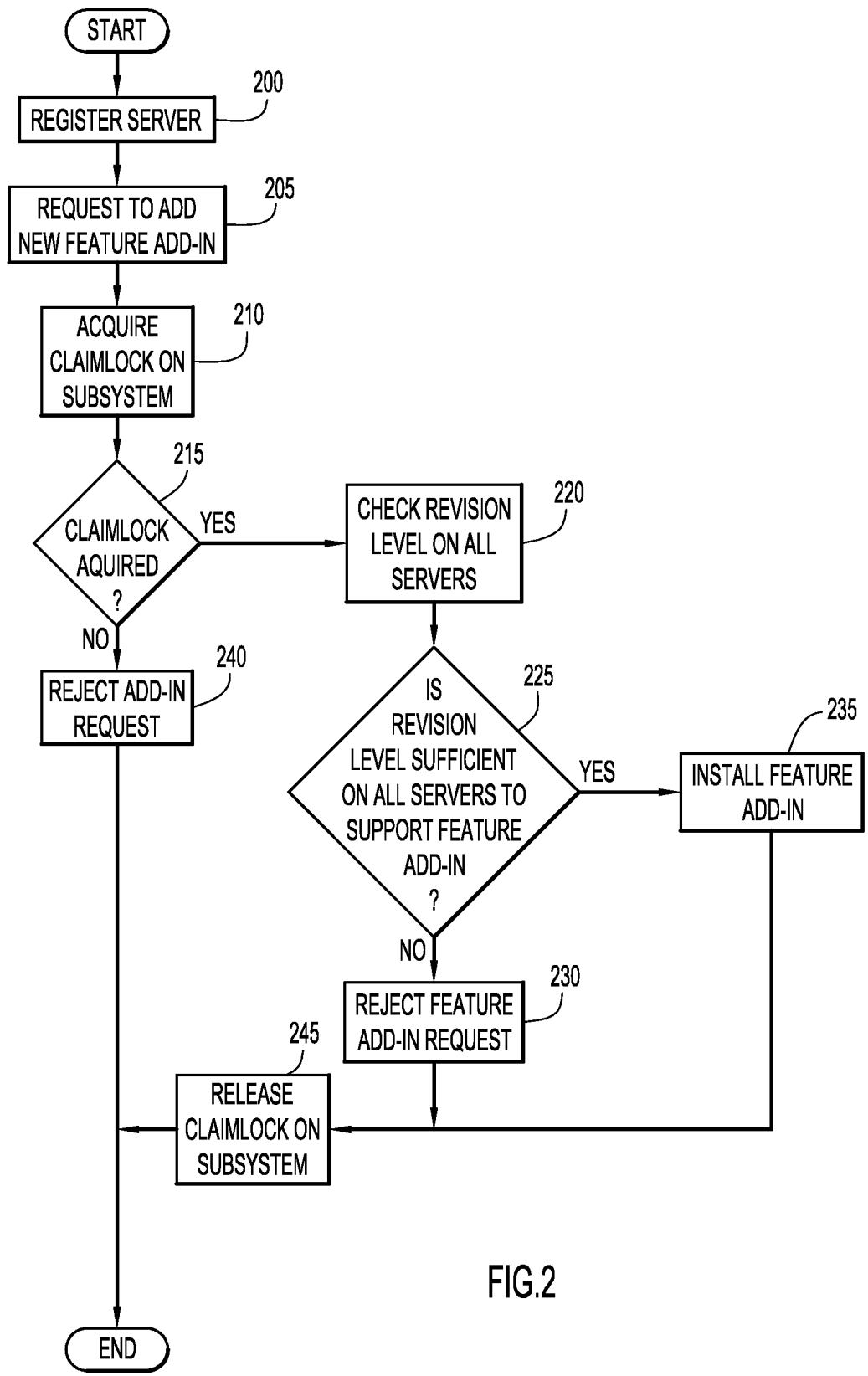
FIG. 2 is a procedural flow chart illustrating a manner in which a requested package is installed according to an embodiment of the present invention.

A manner in which a requested package or add-in component is installed in a server farm or group according to an embodiment of the present invention (e.g., via registration module 20, install module 22, and corresponding server systems 10) is illustrated in FIG. 2. Initially, each server instance of a server system 10 (e.g., physical and/or virtual server instances) registers or otherwise communicates a corresponding code revision level at step 200 (e.g., via registration module 20 and corresponding server system 10). The code revision level and other information pertaining to each server instance is stored in database system 18. This provides a central storage location to enable each operating server system within a given deployment to ascertain the revision level of each server instance, thereby facilitating determination of when a deployment attains a code revision level sufficient to support the application of a desired add-in component. If a deployment does not attain a sufficient code revision level, the application of the add-in component is prevented regardless of which server system receives the request to apply that component as described below.

Each server instance preferably registers with a content repository (or database system 18) at start-up, and provides information including a status and a specification of the current code revision level associated with that server instance. The content repository maintains a set of subsystem configuration data to record and control the state of the system (or server group) at any given time in order to provide the guarantees pertaining to packages or add-in components and code revision levels. A locking mechanism (e.g., a claim lock) is employed that can be set to limit activities occurring across the server group or farm as described below. This is preferably implemented as a flag within the subsystem configuration data (e.g., indicating the open/closed status of the lock), and controls the state of the system and the application of any add-in components. The subsystem configuration data further includes information for each server instance, and for each package or add-in component applied to the system.

Once registration is performed, a request to apply (e.g., add or otherwise update the server group with) a package or add-in component is received at a server system 10 at step 205 for processing (e.g., via install module 22 and the receiving server system 10). The lock mechanism is acquired at step 210. If initial attempts fail to acquire the lock mechanism, the acquisition is retried for a specified number of times. Basically, the corresponding flag within the subsystem configuration data is examined to determine the state of the lock. When the lock is in an open state, the flag is set by the server system acquiring the lock to indicate acquisition of the lock and prevent activities from occurring within the system (or server group) as described below. When the lock mechanism is not acquired (e.g., the lock remains acquired by another server system and does not enter an open state) as determined at step 215, the request for the add-in component is denied or rejected at step 240.

The lock mechanism basically eliminates possible race conditions, and is acquired whenever a server instance attempts to update a persisted state. This enables the system to block new server instances from starting up or joining the server farm or group once a determination has been made with respect to the overall minimum code revision level of the system and the application of an associated add-in component.

When the lock mechanism is acquired as determined at step 215, the current code revision levels for each operating server instance are retrieved from database system 18 and examined at step 220. If the current code revision levels for each operating server instance are sufficient for the requested package or add-in component as determined at step 225 (e.g., the code revision level of each server instance is greater than or equal to the code revision level of the requested add-in component), the add-in component is installed on the system at step 235. Further, the add-in component is registered with the content repository (e.g., database system 18) in order to verify that new server instances starting up contain sufficient code revision levels to support the applied add-in component as described below. Accordingly, a corresponding record within the subsystem configuration data is created that specifies the minimum code revision level required for the newly installed package or add-in component.

If the current code revision levels for one or more operating server instances are insufficient for the requested package or add-in component as determined at step 225 (e.g., the code revision levels of one or more server instances are less than the code revision level of the requested add-in component), the request for the add-in component is rejected at step 230. Once the request has been processed and appropriate action taken (e.g., rejected at step 230 or the add-in component installed at step 235), the lock mechanism is released at step 245. This is accomplished by setting the corresponding flag in the subsystem configuration data to indicate that the lock is in an open state, thereby enabling acquisition by a subsequent server system.

Figure 3:
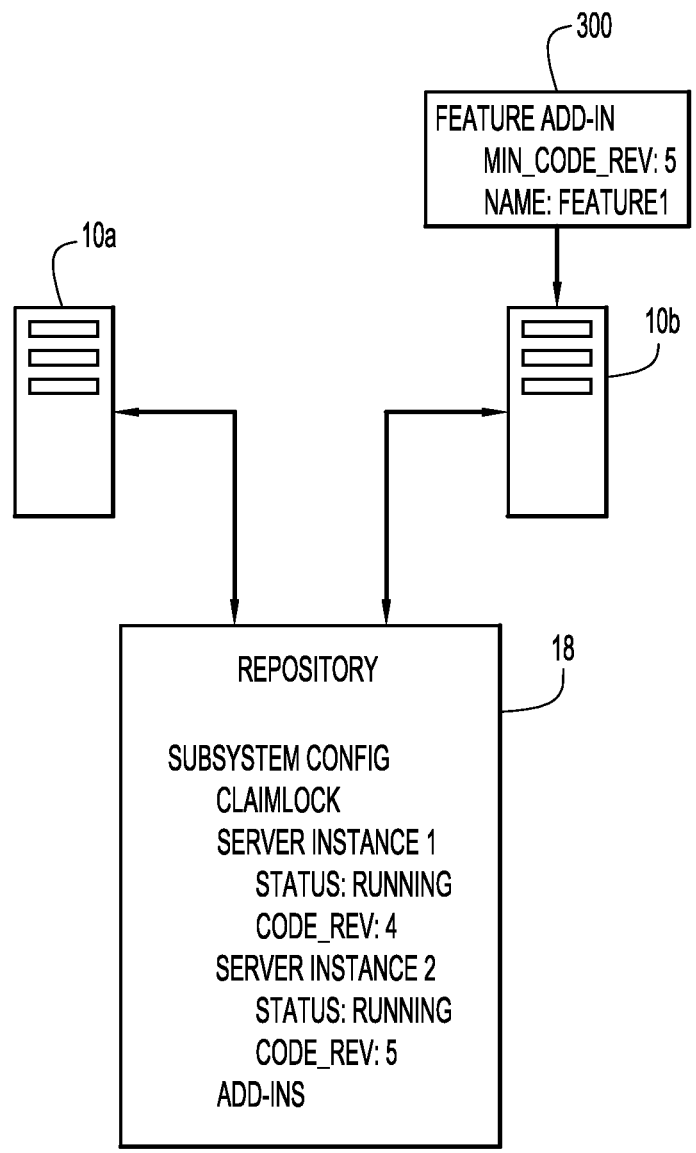
FIG. 3 is a diagrammatic illustration of an example scenario of denying installation of a requested package according to an embodiment of the present invention.

An example scenario rejecting a request for application of a package or add-in component is illustrated in FIG. 3. Initially, server systems 10a and 10b each include a corresponding server instance with their status stored in database system 18. By way of example, the server instance of system 10a has a code revision level of 4 and a status of running, while the server instance of server system 10b has a code revision level of 5 and a status of running. Sever system 10b receives a request 300 for a package or add-in component. The request includes the name and minimum code revision level for the add-in component. In this example scenario, the add-in component includes a name of Feature1 and a minimum code revision level of 5. Server system 10b acquires the lock mechanism, and proceeds to retrieve and examine the code revision levels of the operating server instances stored in database system 18. Since the server instance of server system 10a includes a code revision level (e.g., 4) less than the minimum code revision level (e.g., 5) of the add-in component, the request is rejected or denied and the lock mechanism is released.

Figure 4:
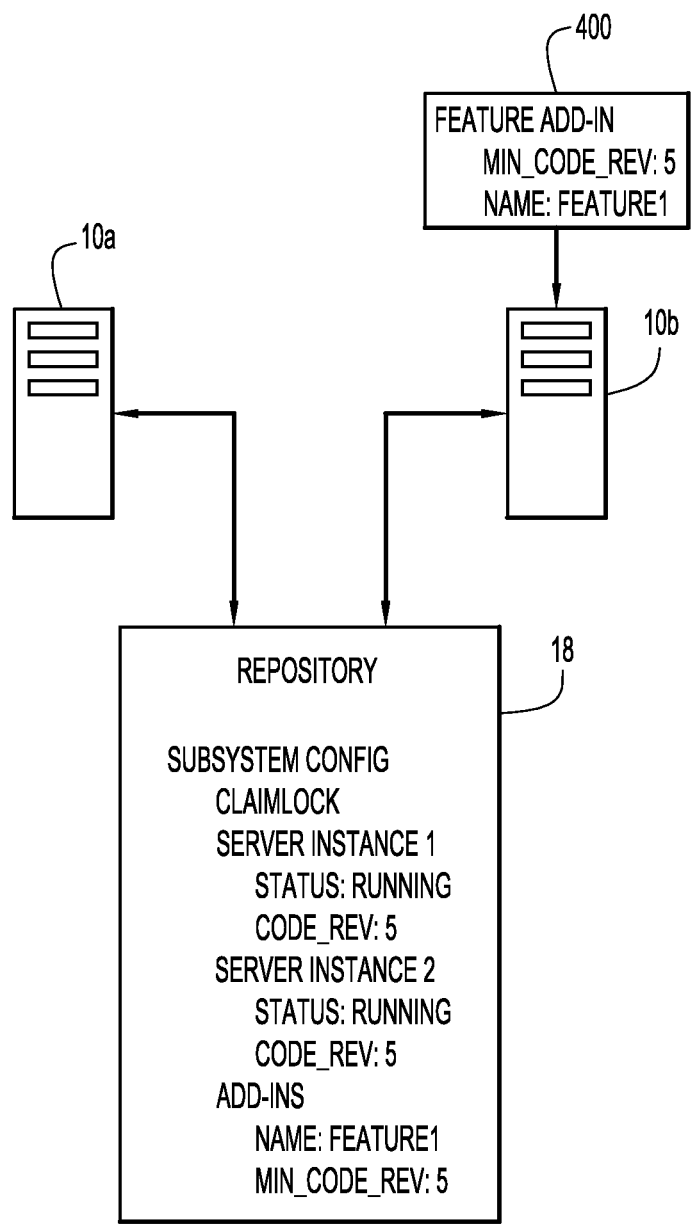
FIG. 4 is a diagrammatic illustration of an example scenario of allowing installation of a requested package according to an embodiment of the present invention.

An example scenario allowing installation of a package or add-in component is illustrated in FIG. 4. Initially, server systems 10a and 10b each include a corresponding server instance with their status stored in database system 18. By way of example, the server instance of system 10a has a code revision level of 5 and a status of running, while the server instance of server system 10b has a code revision level of 5 and a status of running. Sever system 10b receives a request 400 for a package or add-in component. The request includes the name and minimum code revision level for the add-in component. In this example scenario, the add-in component includes a name of Feature1 and a minimum code revision level of 5. Server system 10b acquires the lock mechanism, and proceeds to retrieve and examine the code revision levels of the operating server instances stored in database system 18. Since the server instances of server systems 10a and 10b each include a code revision level (e.g., 5) greater than or equal to the minimum code revision level (e.g., 5) of the add-in component, the add-in component is installed in the system and the lock mechanism is released. In addition, the installed add-in component is registered, where the corresponding name and minimum code revision level for that component are stored in database system 18.

The installation of packages or add-in components is controlled to enable these components to be installed in response to all operating server instances of a system satisfying the minimum code revision level requirements specified for the add-in component. This enables a series of add-in components for a system update or upgrade to be incrementally applied (e.g., on a component by component basis) to a system while ensuring compatibility of the operating server instances with the add-in components.

However, the add-in components may be applied during a time interval when one or more server instances of the system are unavailable. For example, a server instance may be disabled for routine maintenance or updates (e.g., to install a new code revision), while remaining server instances are operational to avoid disabling the entire system. In this case, the server instance may become incompatible with new add-in components installed during the time period the server instance was unavailable. Accordingly, present invention embodiments verify newly available server instances for compatibility with installed add-in components prior to enabling completion of start-up and joining a sever group or farm. This enables one or more server instances to be rendered unavailable (e.g., for maintenance, updates, etc.) while maintaining operation of the system via remaining available server instances.

Figure 5:
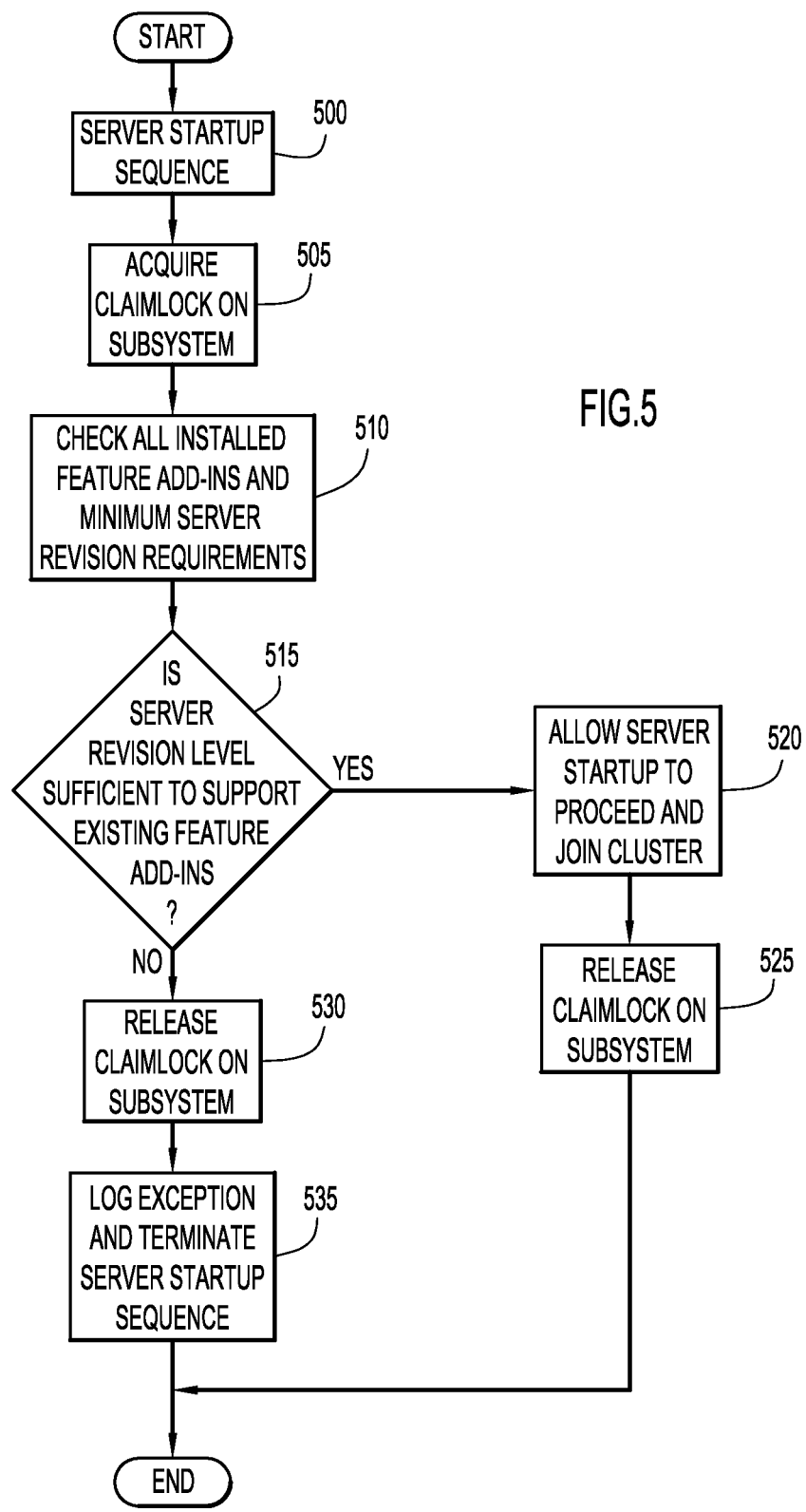
FIG. 5 is a procedural flow chart illustrating a manner in which a server instance is verified for use with installed packages according to an embodiment of the present invention.

A manner in which a server instance is verified for use with installed packages or add-in components (e.g., via verify module 24 and a corresponding server system 10) according to an embodiment of the present invention is illustrated in FIG. 5. Initially, a server instance is initiated and a start-up sequence for the server instance is commenced at step 500. The lock mechanism is acquired at step 505 in substantially the same manner described above. If initial attempts fail to acquire the lock mechanism, an appropriate error condition is logged. The lock mechanism enables the system to block new server instances from starting up or joining the server farm or group once a determination has been made with respect to the overall minimum code revision level of the system and the add-in components.

Once the lock mechanism is acquired, the current code revision levels for each installed add-in component are retrieved from database system 18 and examined at step 510. If the initiated server instance has an insufficient code revision level for one or more of the installed add-in components as determined at step 515 (e.g., the initiated server instance has a minimum code revision level less than the minimum code revision level for one or more of the installed add-in components), the lock mechanism is released at step 530 in substantially the same manner described above. In addition, the start-up sequence is terminated and a warning for the system is logged and/or displayed at step 535 indicating that all new server instances must be at the minimum code revision level in order to start-up and terminate the start-up process.

When the initiated server instance has a code revision level that satisfies the minimum code revision level for each of the installed add-in components as determined at step 515 (e.g., the initiated server instance has a code revision level that is greater than or equal to the minimum code revision level for each of the installed add-in components), the start-up sequence proceeds to completion and the current status and code revision level of the server instance is updated in the subsystem configuration data within database system 18 at step 520. The lock mechanism is subsequently released at step 525 in substantially the same manner described above.

Figure 6:
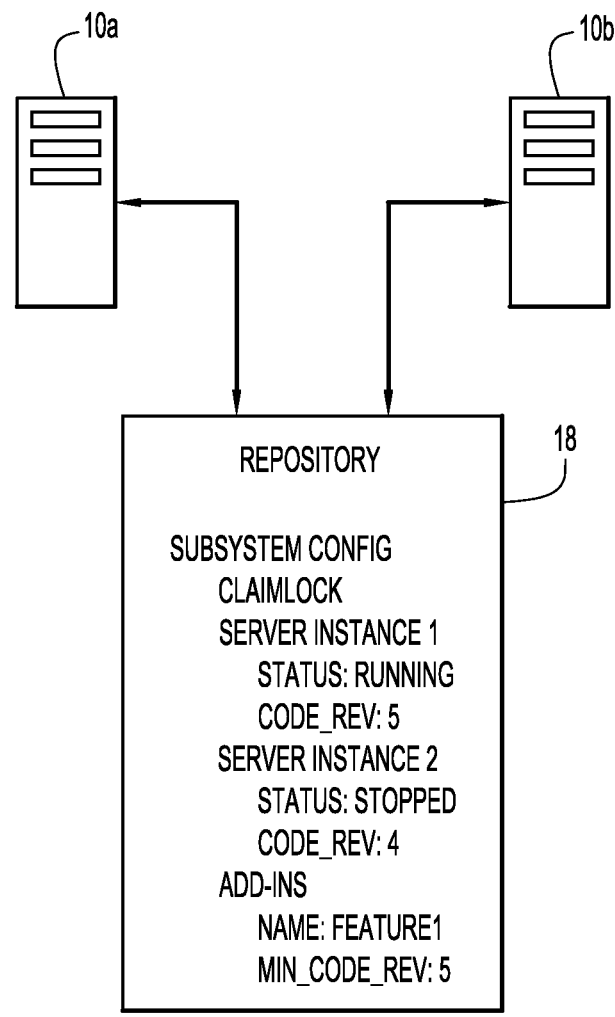
FIG. 6 is a diagrammatic illustration of an example scenario of terminating initiation of a server instance that is incompatible with installed packages according to an embodiment of the present invention.

An example scenario terminating initiation of a server instance that is incompatible with installed packages or add-in components according to an embodiment of the present invention is illustrated in FIG. 6. Initially, server systems 10*a* and 10*b* each include a corresponding server instance with their status stored in database system 18. Further, the information for an installed package or add-in component is stored in database system 18. By way of example, the server instance of system 10*a* has a code revision level of 5 and a status of running, the server instance of server system 10*b* has a code revision level of 4 and a status of stopped, and an installed package or add-in component has a name of Feature1 and a minimum code revision level of 5. Sever system 10*b* includes a server instance that has been initiated and is performing a start-up sequence. Server system 10*b* acquires the lock mechanism, and proceeds to retrieve and examine the code revision levels of the installed add-in components stored in database system 18. Since the server instance of server system 10*b* includes a code revision level (e.g., 4) less than the minimum code revision level (e.g., 5) of the installed add-in component, the start-up sequence of the initiated server instance of server system 10*b* is terminated and the lock mechanism is released.

By way of further example, if the code revision level for the initiated server instance of server system 10*b* is 5 in the above scenario, the initiated server instance satisfies the minimum code revision level for the installed components. Accordingly, the initiated server instance is permitted to complete the start-up sequence and join the server group or farm. In this case, the information of the server instance (e.g., status and code revision level) is updated in database system 18.

Present invention embodiments ensure all operating server instances are controlled in a manner to guarantee that server instance code revision levels meet the minimum requirements of a given package or add-in component. Thus, any applied add-in component has a set of operating server instances with the suitable code elements to support the corresponding feature. This guarantees that the system-wide behaviors are sufficient for a given set of features and capabilities, while enabling the incremental update of server instances.

Present invention embodiments may further control server side program code behaviors depending upon the packages or add-in components that have been applied. The program code is operative with or without a given package or add-in component installed. If an add-in component is present, a given program code path is enabled and executed (if applicable) for a given server operation. If the add-in component is not present, the conditional logic and corresponding program code path is ignored for a given server operation. Generally, packages or add-in components tend to be additive in nature and represent new functionality. This is typically represented as new program code paths within server and/or client applications that are conditionally executed based on the presence of that add-in component.

A given package or add-in component may represent changed behavior to some existing program code path(s). In this case, the old program code paths are maintained for cases where the add-in component is not applied, while the new behavior is represented in a new program code path that conditionally executes when the add-in component is applied. This conditional logic behavior similarly applies to metadata persistence activity. The application of a new feature may require certain metadata schema changes to occur. This process (e.g., synchronous or asynchronous) is initiated at the time the package or add-in component is applied to the system. This initiation may be controlled via the lock mechanism within the subsystem configuration data as described above.

The program code logic may reside within applications 26 of server systems 10 and/or client systems 14. This logic may be implemented by any suitable program code statements including a conditional clause (e.g., IF, DO/FOR loops, branching, etc.). By way of example, the conditional logic may be employed with the following statements.

```
OP1
IF (ADD-IN1)
    OP2
    OP3
    OP4
ENDIF
OP5
``` where OP1-OP5 indicate general operations. In this example, the typical program code flow without the installation of add-in component ADD-IN1 is to perform OP1 and OP5. If the add-in component, ADD-IN1, is installed, operations OP2-OP4 are performed. Thus, the logic may be used in server instances regardless of the installation status of add-in component ADD-IN1. In other words, the system may operate whether or not the add-in components are installed. In this case, applications operate in a typical manner (without utilizing features of the installed add-in components) when the add-in components are not yet installed, and are enabled to utilize the installed add-in components when these components are installed and become available.

The logic statements are performed based on a recorded flag indicating the presence or absence of an add-in component. The flag may be included within the subsystem configuration data. When a package or add-in component is installed and registered with database system 18, the flag is set to indicate the presence of the add-in component. Accordingly, during execution of the logic statements, the flag is retrieved from database system 18 in order to determine the presence or absence of a package or add-in component specified in the logic statement, and traverse the appropriate program code execution path.

It will be appreciated that the embodiments described above and illustrated in the drawings represent only a few of the many ways of implementing embodiments for managing incrementally applied system updates.

The environment or system of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, registration module, install module, verify module, etc.). These systems may include any types of monitors and input devices (e.g., keyboard, mouse, voice recognition, etc.) to enter and/or view information. In addition, the computer systems may host any quantity of any physical or virtual server or other machine instances.

It is to be understood that the software (e.g., registration module, install module, verify module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., registration module, install module, verify module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., code revision levels, packages or add-in component information, code execution flags, locking mechanism flags, etc.) for any quantity of server or other instances (e.g., instances of other types of physical or virtual machines, etc.). The database system may be implemented by any number of any conventional or other databases, data stores or storage structures (e.g., files, databases, data structures, data or other repositories, etc.) to store information (e.g., code revision levels, packages or add-in component information, code execution flags, locking mechanism flags, etc.). The database system may be included within or coupled to the server and/or client systems. The database systems and/or storage structures may be remote from or local to the computer or other processing systems, and may store any desired data (e.g., code revision levels, packages or add-in component information, code execution flags, locking mechanism flags, etc.).

The packages or add-in components may include any quantity of any desired updates or upgrades for the system (e.g., features, data sets or structures, processes, etc.), where any quantity of packages or add-in components may be applied based on the verification. For example, two or more packages may be applied in response to the code revision levels of the server instances satisfying the most recent (e.g., greatest, etc.) code revision level of the packages to be applied. Further, the packages or add-in components may include any portion or an entirety of an overall update for the system.

The code revision levels may be represented by any quantity of any types of characters, numerals or symbols (e.g., numeric, alphanumeric, symbols, etc.) having any desired values. Any values may be utilized to indicate recent or older code revisions (e.g., higher values indicate more recent code revisions, lower values indicate more recent code revisions, length of the value may indicate recent code revisions, etc.). The code revision levels may be compared in any desired fashion to determine compatibility between packages and server instances (e.g., greater than, less than, equal to, etc.). Alternatively, any desired characteristics between the packages and server instances may be compared to determine compatibility (e.g., release dates, titles, indicators within the code, etc.).

The lock mechanism and package presence flags may be represented by any quantity of flags or other indicators. The flags may be represented by any quantity of any types of characters, numerals or symbols (e.g., numeric, alphanumeric, symbols, etc.) having any desired values. Any values may be utilized to indicate the open/closed state of the lock or presence/absence of a package (e.g., a one may represent a closed or acquired state or presence of a package, while a zero may indicate an open or available state or absence of a package, etc.). The various error conditions may be logged or indicated/displayed to the system or user. The notification may include any desired information pertaining to the error condition (e.g., lock not being acquired, incompatible code revision levels, etc.).

Any suitable conditional expression may be utilized to control the program code path based on the presence or absence of a package. These conditional statements may appear within any desired program code on the server, client or other devices coupled to the system.

The present invention embodiments may employ any number of any type of user interface (e.g., Graphical User Interface (GUI), command-line, prompt, etc.) for obtaining or providing information (e.g., packages or add-in components, code revision levels, error notifications, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., packages or add-in components, code revision levels, error notifications, etc.).

The present invention embodiments are not limited to the specific tasks or algorithms described above, but may be utilized for enabling incremental system updates based on compatibility between the system updates and any desired configuration elements or characteristics of object instances (e.g., instances of machines, physical or virtual instances, programs/applications, BIOS or OS updates, etc.). Alternatively, present invention embodiments may accommodate operation of applications regardless of compatibility with installed updates.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the fond disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of updating a system including a plurality of server instances comprising:
    registering each server instance with the system and determining a level of revision for each operating server instance, wherein at least two operating server instances include different levels of revision;
    comparing the determined level of revision of each operating server instance to levels of revision for the plurality of server instances required by one or more sets of operational features;
    adding the one or more sets of operational features for at least one operating server instance to the system based on the comparison indicating that the determined levels of revision of each of the operating server instances satisfy the levels of revision required by each of the one or more sets of operational features;
    registering each added set of operational features with the system to provide information pertaining to associated revision levels; and
    performing server operations of the operating server instances and applying the added one or more sets of operational features to the server operations.

2. The computer-implemented method of claim 1, wherein each set of operational features includes a portion of a system update to incrementally update the system.

3. The computer implemented method of claim 1, wherein the one or more sets of operational features pertain to a system update, and determining the level of revision further includes:
    maintaining one or more server instances operational to enable incremental application of the system update across the plurality of server instances without disabling the entire system.

4. The computer-implemented method of claim 1, further comprising:
    initiating a server instance within the system to perform an initial sequence of operations;
    determining a minimum revision level for each of the added sets of operational features;
    comparing a level of revision of the initiated server instance with the determined minimum levels of revision associated with each of the added sets of operational features; and
    terminating the initial sequence of operations in response to the level of revision of the initiated server instance being insufficient for one or more sets of added operational features.

5. The computer-implemented method of claim 1, wherein adding the one or more sets of operational features includes:
    adding the one or more sets of operational features to the system in response to the determined levels of revision of each of the operating server instances being sufficient for minimum levels of revision of each of the one or more sets of operational features.

6. The computer-implemented method of claim 1, further comprising:
    acquiring a lock mechanism to prevent initiation of additional server instances within the system.

7. The computer-implemented method of claim 1, wherein the server operations include conditional logic to control performance of server operations based on the presence of a specified set of operational features within the system, and performing server operations includes:
    determining the presence of the specified set of operational features within the system;
    bypassing server operations utilizing the specified set of operational features based on the conditional logic and in response to the absence of the specified set of operational features within the system; and
    performing server operations utilizing the specified set of operational features based on the conditional logic and in response to the presence of the specified set of operational features within the system.

8. A computer system for updating a system including a plurality of server instances comprising:
    at least one processor configured to:
    register each server instance with the system and determine a level of revision for each operating server instance, wherein at least two operating server instances include different levels of revision;
    compare the determined level of revision of each operating server instance to levels of revision for the plurality of server instances required by one or more sets of operational features;
    add the one or more sets of operational features for at least one operating server instance to the system based on the comparison indicating that the determined levels of revision of each of the operating server instances satisfy the levels of revision required by each of the one or more sets of operational features;
    register each added set of operational features with the system to provide information pertaining to associated revision levels; and
    perform server operations and apply the added one or more sets of operational features to the server operations.

9. The computer system of claim 8, wherein each set of operational features includes a portion of a system update to incrementally update the system.

10. The computer system of claim 8, wherein the one or more sets of operational features pertain to a system update, and one or more server instances are maintained to be operational to enable incremental application of the system update across the plurality of server instances without disabling the entire system.

11. The computer system of claim 8, wherein the at least one processor is further configured to:
- initiate a server instance within the system to perform an initial sequence of operations;
- determine a minimum revision level for each of the added sets of operational features;
- compare a level of revision of the initiated server instance with the determined minimum levels of revision associated with each of the added sets of operational features; and
- terminate the initial sequence of operations in response to the level of revision of the initiated server instance being insufficient for one or more sets of added operational features.

12. The computer system of claim 8, wherein adding the one or more sets of operational features includes:
- adding the one or more sets of operational features to the system in response to the determined levels of revision of each of the operating server instances being sufficient for minimum levels of revision of each of the one or more sets of operational features.

13. The computer system of claim 8, wherein the at least one processor is further configured to:
- acquire a lock mechanism to prevent initiation of additional server instances within the system.

14. The computer system of claim 8, wherein the server operations include conditional logic to control performance of server operations based on the presence of a specified set of operational features within the system, and performing server operations includes:
- determining the presence of the specified set of operational features within the system;
- bypassing server operations utilizing the specified set of operational features based on the conditional logic and in response to the absence of the specified set of operational features within the system; and
- performing server operations utilizing the specified set of operational features based on the conditional logic and in response to the presence of the specified set of operational features within the system.

15. A computer program product for updating a system including a plurality of server instances comprising:
- a computer readable storage memory having computer readable program code stored thereon, the computer readable program code comprising computer readable program code configured to:
- register each server instance with the system and determine a level of revision for each operating server instance, wherein at least two operating server instances include different level of revision;
- compare the determined level of revision of each operating server instance to levels of revision for the plurality of server instances required by one or more sets of operational features;
- add the one or more sets of operational features for at least one operating server instance to the system based on the comparison indicating that the determined levels of revision of each of the operating server instances satisfy the levels of revision required by each of the one or more sets of operational features;
- register each added set of operational features with the system to provide information pertaining to associated revision levels; and
- perform server operations and apply the added one or more sets of operational features to the server operations.

16. The computer program product of claim 15, wherein each set of operational features includes a portion of a system update to incrementally update the system.

17. The computer program product of claim 15, wherein the one or more sets of operational features pertain to a system update, and one or more server instances are maintained to be operational to enable incremental application of the system update across the plurality of server instances without disabling the entire system.

18. The computer program product of claim 15, wherein the computer readable program code further comprises computer readable program code configured to:
- initiate a server instance within the system to perform an initial sequence of operations;
- determine a minimum revision level for each of the added sets of operational features;
- compare a level of revision of the initiated server instance with the determined minimum levels of revision associated with each of the added sets of operational features; and
- terminate the initial sequence of operations in response to the level of revision of the initiated server being insufficient for one or more sets of added operational features.

19. The computer program product of claim 15, wherein adding the one or more sets of operational features includes:
- adding the one or more sets of operational features to the system in response to the determined levels of revision of each of the operating server instances being sufficient for minimum levels of revision of each of the one or more sets of operational features.

20. The computer program product of claim 15, wherein the computer readable program code further comprises computer readable program code configured to:
- acquire a lock mechanism to prevent initiation of additional server instances within the system.

21. The computer program product of claim 15, wherein the computer readable program code configured to perform server operations includes conditional logic to control performance of server operations based on the presence of a specified set of operational features within the system, and the computer readable program code configured to perform server operations includes computer readable program code configured to:
- determine the presence of the specified set of operational features within the system;
- bypass server operations utilizing the specified set of operational features based on the conditional logic and in response to the absence of the specified set of operational features within the system; and
- perform server operations utilizing the specified set of operational features based on the conditional logic and in response to the presence of the specified set of operational features within the system.

* * * * *